United States Patent [19]

Hawkins

[11] Patent Number: 4,787,938

[45] Date of Patent: Nov. 29, 1988

[54] COUNTERCURRENT DRUM MIXER ASPHALT PLANT

[75] Inventor: Michael R. Hawkins, Prairie Village, Kans.

[73] Assignee: Standard Havens, Inc., Kansas City, Mo.

[21] Appl. No.: 879,996

[22] Filed: Jun. 30, 1986

[51] Int. Cl.[4] ............... C09D 3/24; C08L 95/00
[52] U.S. Cl. ................. 106/281.1; 432/14; 432/19
[58] Field of Search ........... 106/281 R, 309; 432/14, 432/15, 19

[56] References Cited

U.S. PATENT DOCUMENTS

| | | | |
|---|---|---|---|
| Re. 30,685 | 7/1981 | Mendenhall | 106/280 |
| 2,448,042 | 8/1948 | Miller | 259/7 |
| 3,306,237 | 2/1967 | Ransom, Jr. | 110/186 |
| 3,540,709 | 11/1970 | Gardner et al. | 432/111 |
| 3,788,609 | 1/1974 | Toczyski | 366/289 |
| 3,892,045 | 7/1975 | Hage et al. | 34/28 |
| 4,104,736 | 8/1978 | Mendenhall | 366/2 |
| 4,106,110 | 8/1978 | Mendenhall | 366/2 |
| 4,126,397 | 11/1978 | Mendenhall | 366/7 |
| 4,136,966 | 1/1979 | Mendenhall | 366/25 |
| 4,142,803 | 3/1979 | Mendenhall | 366/25 |
| 4,153,471 | 5/1979 | Mendenhall | 106/281 R |
| 4,182,631 | 1/1980 | Mendenhall | 106/281 R |
| 4,183,885 | 1/1980 | Marazzi | 501/141 |
| 4,189,238 | 2/1980 | Mendenhall | 106/281 R |
| 4,191,546 | 3/1980 | Kroyer | 501/39 |
| 4,208,131 | 6/1980 | Mendenhall | 366/7 |
| 4,219,278 | 8/1980 | Mendenhall | 366/4 |
| 4,234,346 | 11/1980 | Latta, Jr. et al. | 106/281 R |
| 4,238,241 | 12/1980 | Schneider | 106/281 R |
| 4,240,754 | 12/1980 | Mendenhall | 366/4 |
| 4,256,506 | 3/1981 | Mendenhall | 106/280 |
| 4,265,546 | 5/1981 | Mendenhall | 366/7 |
| 4,298,337 | 11/1981 | Butler et al. | 431/285 |
| 4,309,113 | 1/1982 | Mendenhall | 366/4 |
| 4,326,809 | 4/1982 | Mendenhall | 366/4 |
| 4,351,251 | 9/1982 | Brashears | 110/261 |
| 4,382,682 | 5/1983 | Mendenhall | 366/25 |
| 4,387,996 | 6/1983 | Mendenhall | 366/4 |
| 4,398,826 | 8/1983 | Mendenhall | 366/25 |
| 4,439,040 | 3/1984 | Mendenhall | 366/2 |
| 4,477,250 | 10/1984 | Brashears et al. | 432/3 |
| 4,480,922 | 11/1984 | Mendenhall | 366/25 |
| 4,481,039 | 11/1984 | Mendenhall | 106/281 R |
| 4,515,090 | 5/1985 | Brashears et al. | 110/264 |
| 4,555,182 | 11/1985 | Mendenhall | 366/25 |
| 4,600,379 | 7/1986 | Elliott | 432/13 |

*Primary Examiner*—Amelia Burgess Yarbrough
*Attorney, Agent, or Firm*—Kokjer, Kircher, Bradley, Wharton, Bowman & Johnson

[57] ABSTRACT

A drum mixer asphalt plant is provided with a rotatable cylinder 10 in which virgin aggregate, recycle material and liquid asphalt are mixed to produce an asphaltic composition and the hot gas stream for heating and drying the materials flow in countercurrent relation. In a first zone within the cylinder 10, aggregates are heated and dried by heat radiation and a hot gas stream generated at a burner head 46 of a combustion assembly 40. In a second zone within the drum cylinder 10 isolated from the burner flame and hot gas stream by the combustion assembly 40, liquid asphalt is sprayed from an injection tube 76 to mix with aggregate materials. A recycle feed assembly 60 delivers recycle asphalt material to the second zone also for mixing with the aggregate and liquid asphalt.

4 Claims, 2 Drawing Sheets

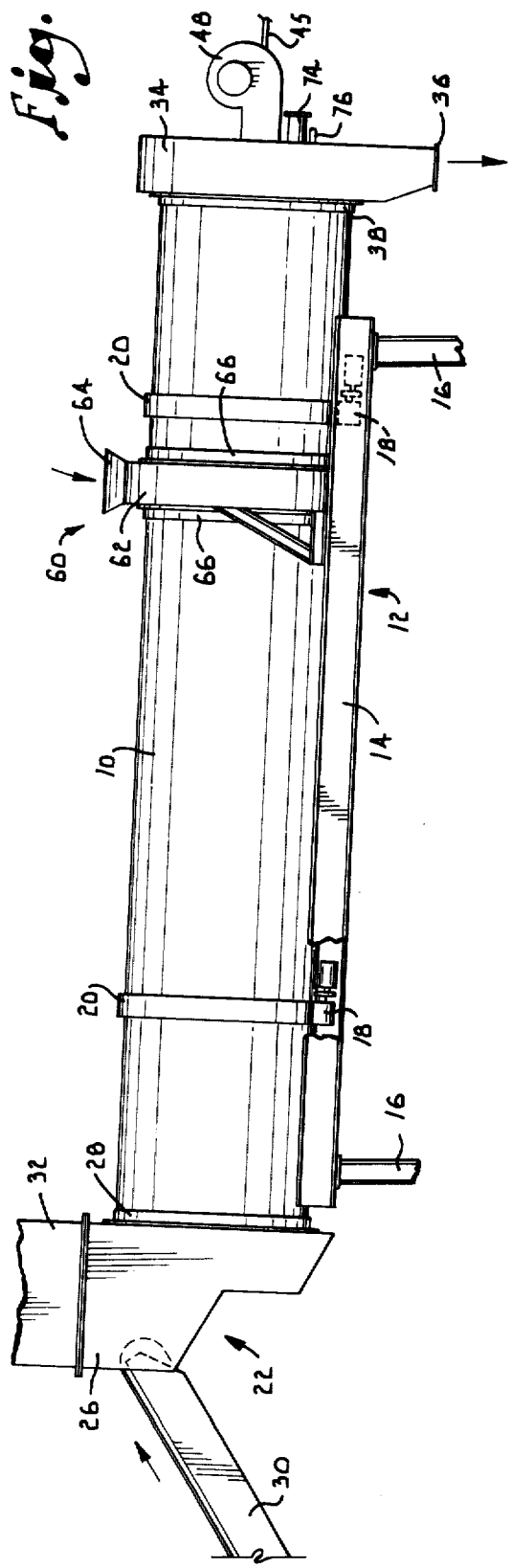
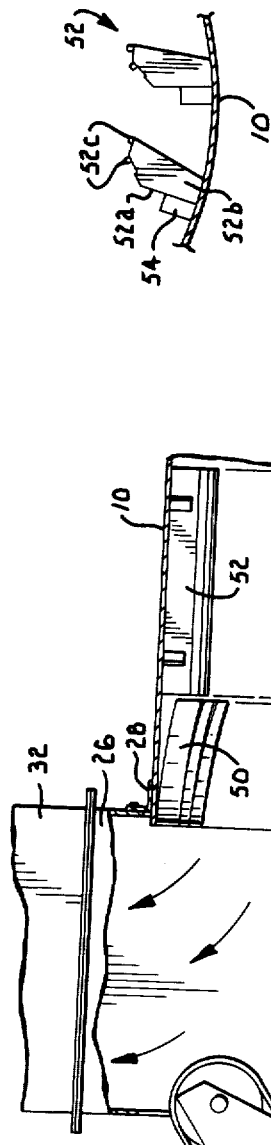
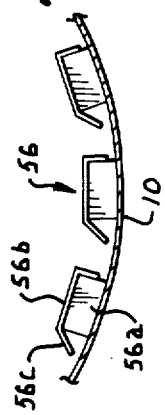
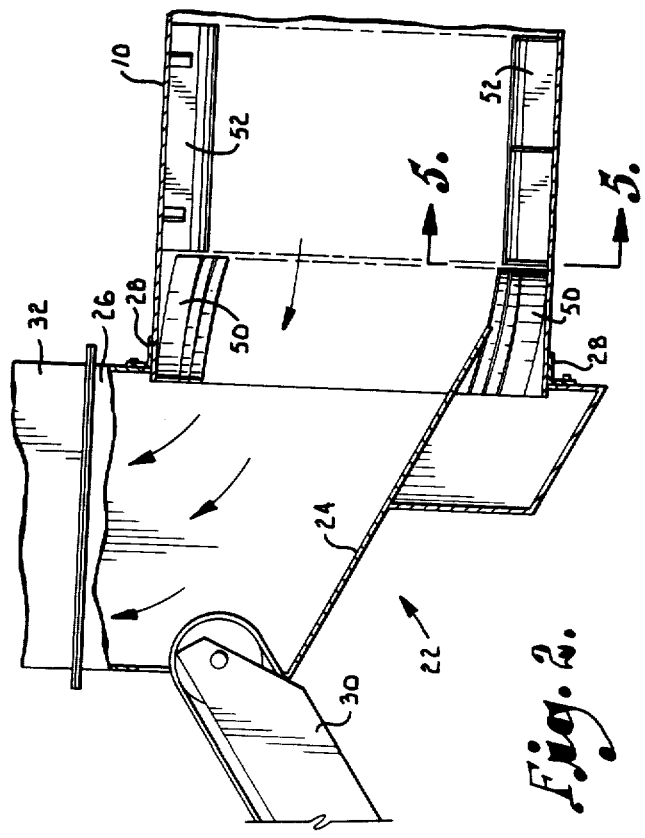

COUNTERCURRENT DRUM MIXER ASPHALT PLANT

BACKGROUND OF THE INVENTION

This invention relates to a drum mixer asphalt plant used to produce a variety of asphalt compositions. More specifically, this invention relates to a drum mixer in which the region for the introduction of liquid asphalt and mineral fines, as well as recycle asphalt material, is isolated from hot combustion gases used to dry and heat the aggregate material.

Several techniques and numerous equipment arrangements for the preparation of asphaltic cement, also referred by the trade as "hotmix" or "HMA", are known in the prior art. Particularly relevant to the present invention is the production of asphalt compositions in a drum mixer asphalt plant. Typically, water-laden virgin aggregates are heated and dried within a rotating, open-ended drum mixer through radiant, convective and conductive heat transfer from a stream of hot gases produced by a burner flame. The prior art consistently teaches that the burner flame and the aggregate material are located at the same end of the drum mixer such that the hot gas stream and the aggregate material pass through the drum mixer in co-current flow.

As the aggregate material flows through the drum mixer, it is combined with liquid asphalt and mineral binder or "fines" to produce an asphalt composition. Exposing the liquid asphalt to excessive temperatures within the drum mixer or in close proximity with the burner flame causes serious product degradation, in addition to health and safety hazards. As a result, various attempts have been proposed to held minimize combustion of the liquid asphalt necessary in the process.

Paddles or flighting mounted on the interior of the mixer have been used to shield the liquid asphalt from the burner flame by creating a curtain of falling aggregate material disposed between the burner flame and the asphalt. While the flighting reduces the likelihood of combustion of the asphalt, the stream of hot gases emitted by the burner flame may still heat the asphalt to an excessive temperature. In such event, the more volatile components of the asphalt are released and the final product may become unfit for use in paving operations.

Excessive heating of asphalt compositions also results in a substantial air pollution control problem, known as "blue-smoke", caused when hydrocarbon constituents of asphalt are driven off and released into the atmosphere. Significant investments and efforts have been made by the industry in attempting to control blue-smoke emissions.

Improvement is also needed in those drum mixers which recycle asphaltic cement removed from road surfaces. In these mixers, the recycle material is ground to a suitable size and mixed with the virgin aggregate prior to mixing with the asphalt. The presence of asphalt in the recycle material creates essentially the same problems in asphalt production as does the presence of liquid asphalt. The volatile components of the asphalt are released upon exposure to high temperatures and carried in the exhaust gases to the air pollution control equipment, typically a baghouse. Within the baghouse, the blue-smoke or tiny particles of asphalt will condense on the filter bags reducing their efficiency and presenting a serious fire hazard. The useful life of the fabric filter used in the baghouse is also reduced when contaminated with asphalt.

The foregoing disadvantages and problem areas are characteristically compounded with the traditional requirement that the asphalt material with the drum mixer flows in the same direction (i.e., co-current flow) as the hot gases for heating and drying the aggregate. Thus, the asphalt component of recycle material and liquid asphalt itself is, by necessity, in direct contact with the hot gas stream and, in some instances, even the burner flame itself.

The need remains in the asphalt industry for improved drum mixer design and operating techniques to address the problems and drawbacks heretofore experienced. The primary objective of this invention is to meet this need.

SUMMARY OF THE INVENTION

More specifically, an object of the invention is to provide a drum mixer which effectively isolates liquid asphalt from the radiant heat flux of a burner flame and a stream of hot gases produced therefrom.

Another object of this invention is to provide a drum mixer which may be used with recycle material and which effectively isolates the recycle material from the burner flame and hot gases.

An additional object of the invention is to provide a drum mixer of the character described which is both safe and economical in operation. Efficient operation results in improved fuel consumption and in reduced air pollution emissions.

A corollary object of the invention is to provide a drum mixer of the foregoing character which is quieter in operation to render a safer work environment for asphalt workers and to render the asphalt plant less objectionable by community standards.

A further object of this invention is to provide a drum mixer of the type described which reduces the amount of hydrocarbons released to the environment.

It is a still further object of this invention to provide a drum mixer of the type described which reduces the amount of hydrocarbons entrained in the hot gas stream and carried to the air pollution control equipment.

Other and further objects of the invention, together with the features of novelty appurtenant thereto, will appear in the description of the drawings.

In summary, a drum mixer is provided with a rotatable cylinder in which aggregates, recycle materials and liquid asphalt are mixed to produce an asphaltic composition. Within a first zone in the drum cylinder, virgin aggregate is heated and dried by heat radiation and the stream of hot gases produced by a burner flame flowing in countercurrent flow to the aggregate itself to establish a highly beneficial heat transfer relationship. Toward the discharge end of the drum cylinder, a second zone is defined in which recycle materials are added and in which liquid asphalt is then mixed with the aggregates. An elongated combustion assembly is interiorly disposed within the drum cylinder along the central axis thereof and extends from the discharge end of the drum through the mixing zone to segregate the hot gases from the asphalt to prevent degradation of the final product. The hot gas stream is withdrawn from the drum cylinder at the upstream or inlet end thereof and delivered by ductwork to air pollution control equipment. Accordingly, the liquid asphalt, recycle material and virgin aggregate are mixed within the drum in an annular region between the drum cylinder and the combustion assembly where contact with the burner flame or with the hot gas stream is eliminated.

BRIEF DESCRIPTION OF THE DRAWINGS

In the following description of the drawings, in which like reference numerals are employed to indicate like parts in the various views:

FIG. 1 is a side elevational view of an asphalt plant drum mixer constructed in accordance with a preferred embodiment of the invention, and shown connected to the aggregate feed conveyor, burner assembly and exhaust gas ductwork;

FIG. 2 is an enlarged sectional view of end of the drum mixer connected with the aggregate feed conveyor and the exhaust gas ductwork;

FIG. 5 is an enlarged fragmentary view taken along line 5—5 of FIG. 2 in the direction of the arrows to illustrate the details of the flighting associated with the indicated material handling zone; and FIG. 6 is an enlarged fragmentary view taken along line 6—6 of FIG. 3 in the direction of the arrows to illustrate the details of the flighting associated with the indicated material handling zone.

DETAILED DESCRIPTION OF THE DRAWINGS

Figure 3:
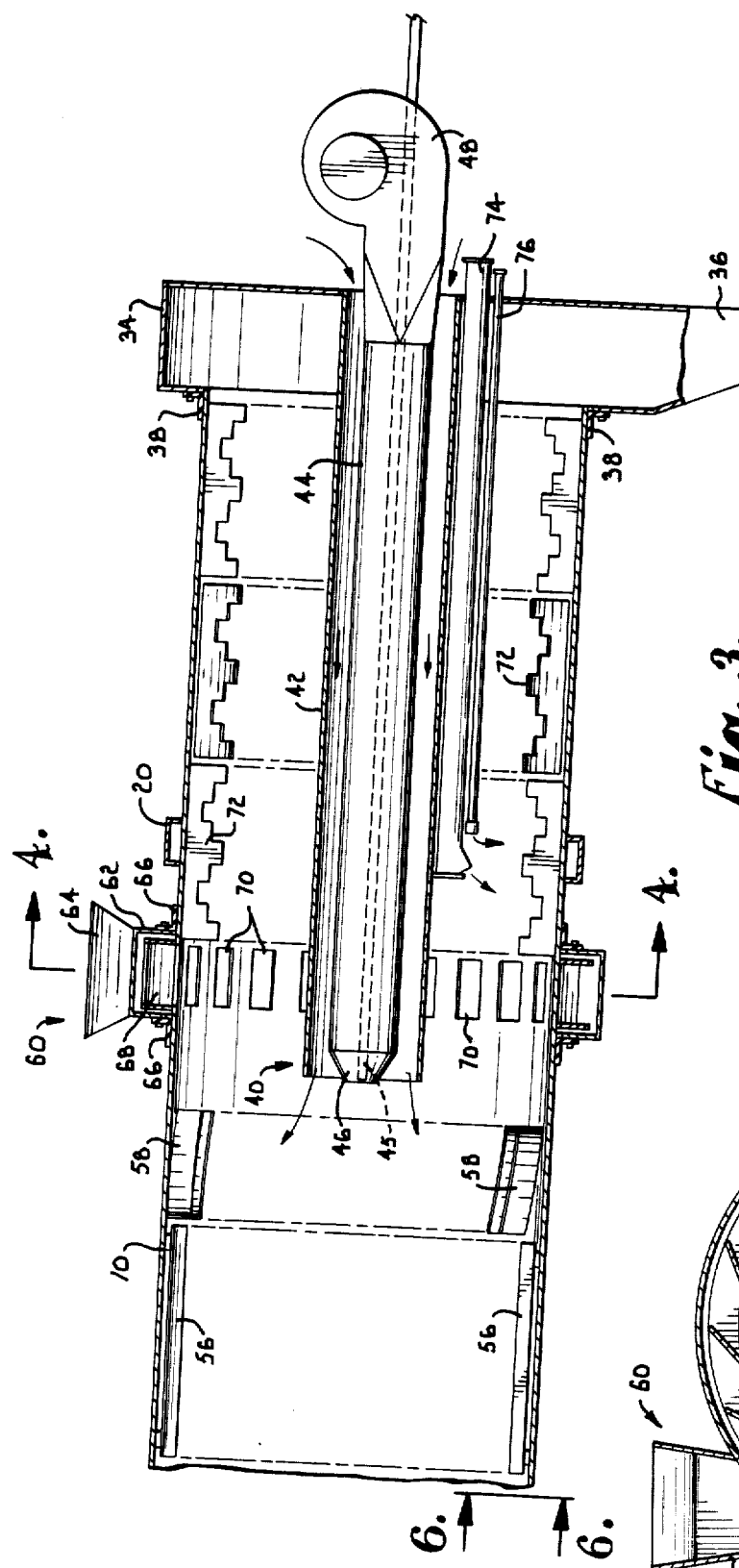
FIG. 3 is an enlarged sectional view of end of the drum mixer connected with the burner assembly.
Figure 4:
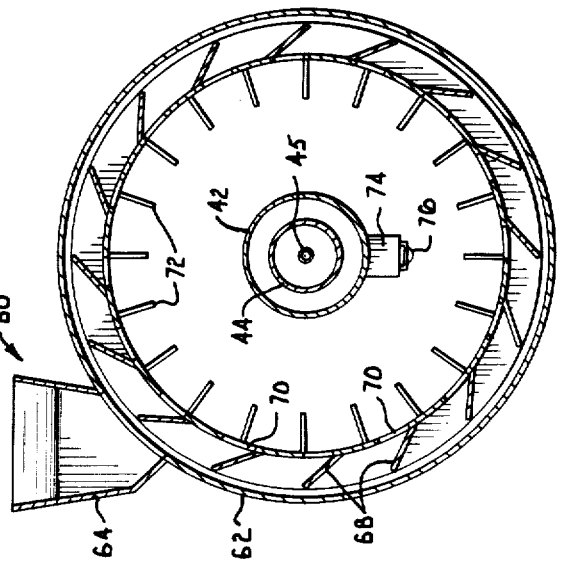
FIG. 4 is an enlarged sectional view taken through the recycle feed assembly along line 4—4 of FIG. 3 in the direction of the arrows.

Referring now to the drawings in greater detail, the asphalt equipment of this invention includes a substantially horizontal drum cylinder 10 carried by a ground engaging support frame 12.

The framework 12 comprises spaced apart, parallel beams 14 inclined from a horizontal orientation and supported by vertical legs 16. Mounted on the parallel beams 14 are a plurality of motor driven rollers 18 which supportingly receive trunnion rings 20 secured to the exterior surface of the drum cylinder 10. Thus, rotation of the drive rollers 18 engaging the trunnion rings 20 causes the drum cylinder 10 to be rotated on its longitudinal axis.

Located at the inlet or upstream end of the drum cylinder 10 is a substantially closed feed chute 22 illustrated in FIGS. 1 & 2. The feed chute 22 is fabricated as a fixed housing having a circular opening to receive the inlet end of the drum cylinder and a bearing seal 28 bolted to the outer wall of the feed chute 22 to permit rotation of the drum cylinder 10 within the feed chute 22. The forward wall of the feed chute 22 has an opening penetrated by the discharge end of a material conveyor 30 adapted to deliver aggregate to the feed chute 22 from a storage hopper or stockpile (not shown). The end of the material conveyor 30 is positioned above an inclined slide plate 24 of the feed chute 22 which extends into the open inlet end of the drum cylinder to direct aggregate received from the material conveyor 30 into the drum cylinder 10.

The upper end of the feed chute 22 includes a flanged exhaust port 26 connected to ductwork 32, a portion of which is shown in FIGS. 1 & 2, leading to conventional air pollution control equipment, such as a baghouse, to remove particulates from the gas stream.

Located at the outlet end of the drum cylinder 10, as illustrated in FIGS. 1 & 3, is a discharge housing 34. The discharge housing 34 includes a circular opening to receive the outlet end of the drum cylinder 10 and a bearing seal 38 bolted to the wall of the discharge housing 34 to permit rotation of the drum cylinder 10. The lower portion of the discharge housing 34 is fabricated as a funnel or discharge mouth 36 to direct asphaltic composition from the drum cylinder 10 to a material conveyor (not shown) for delivery of the product to a storage bin or transporting vehicle.

As best shown in FIG. 3, a combustion assembly 40 extends through the discharge housing 34 and into the drum cylinder 10. The combustion assembly 40 includes an elongate secondary air tube 42 which at one end thereof extends through the discharge housing to establish atmospheric communication and which centrally penetrates the drum cylinder 10 to coincide with the longitudinal axis thereof. The secondary air tube 42 is roughly one-third the length of the drum cylinder 10 itself, although this relative dimension may be varied as necessary.

Received within the secondary air tube 42 is a primary tube 44 having a burner head 46 on the innermost end thereof. Concentrically disposed within the primary tube 44 is a fuel line 45 which is connected to an exterior fuel supply (not shown). The primary tube 44 is of smaller diameter than the secondary air tube 42 to form an annulus therewith in which secondary air is drawn from the outside, as indicated by the arrows, to support combustion at the burner head 46. Fitted to the opposite end of the primary tube 44 is a blower 48 to force blower air through the primary tube 44 to the burner head 46. As the primary blower air is discharged from the burner head 46, it atomizes fuel from fuel line 45 to maintain a burner flame directed longitudinally into the drum cylinder 10.

At different regions throughout the interior of the drum cylinder 10 are fixed various types of flightings or paddles for the alternative purposes of lifting, mixing, guiding and stirring the material contained within the drum cylinder 10. The actions of the various flightings are known to those skilled in the art and, accordingly, the flightings now disclosed are intended as workable embodiments but are not exhaustive of the various combinations which could be utilized with the invention.

At the inlet end of the drum cylinder 10, slanted guide paddles 50 are fixed to the interior of the cylinder to direct material from the feed chute 22 inwardly to bucket flighting 2.

The bucket flighting 52 is arranged in longitudinal rows with the axis of the drum cylinder 10. An end view of two rows of bucket flighting 52 is shown in FIG. 5. Each open-topped bucket 52 forming the flighting includes a bottom plate 52a supported by brackets 54 from the interior wall of the drum cylinder 10. Spaced apart bucket side walls 52b are joined to the bottom plate 52a. Mounted on the outermost ends of the bucket side walls 52b are parallel bars 52c which form elongate slot openings on the sides of the buckets 52 innermost within the drum cylinder 10. So configured and arranged, when the drum cylinder 10 is rotated, aggregate material in the bottom of the drum cylinder 10 will be picked up by the bucket flighting 52. As the bucket flighting 52 rotates upwardly, material first begins to fall through the elongate openings formed by the parallel bars 52c connected to the bucket side walls 52b. As the bucket flighting 52 rotates further upward, then material begins to spill out from the open top of the bucket 52 and all the material is discharged therefrom as the bucket 52 descends back to the bottom of the drum cylinder 10.

Downstream of the bucket flighting 52, low-profile combustion flighting 56 as shown in FIG. 6 is mounted to the inner surface by brackets 56a and comprise L-shaped plates 56b having an outwardly and downwardly projecting flange 56c. The L-shaped plates 56b are mounted with the cavity formed by the shape of the plate facing the interior wall of the drum cylinder 10, and with the length of the plate extending along the longitudinal axis of the drum cylinder 10. The aggregates are carried around the inner surface of the drum cylinder 10 by the combustion flighting 56 as the cylinder rotates, without creating a falling curtain of material as is the case with the bucket flighting 52.

At the end of the combustion flighting 56, slanted guide plates 58 are fixed to the interior of the cylinder to direct material from the heating and drying zones of the drum cylinder 10 previously described into the mixing zone in the annulus formed by the drum cylinder 10 and the secondary air tube 42.

Downstream of the end of the burner head 46 is located the recycle feed assembly 60 by which recycle asphalt material may be introduced into the drum cylinder 10. A stationary box channel 62 encircles the exterior surface of the drum cylinder 10 and includes a feed hopper 64 providing access to the interior of the box channel 62. Bolted to the side walls of the box channel 62 are angular bearing seals 66 to permit rotation of the drum cylinder 10 within the encircling box channel 62. Secured to the outer wall of the drum cylinder 10 and projecting into the space defined by the box channel 62 are a plurality of scoops 68 radially spaced around the drum cylinder 10. At the bottom of each scoop 68 is a scoop opening 70 through the wall of the drum cylinder to provide access to the inside of drum cylinder 10. Thus, recycle asphalt material, as indicated by the arrow in FIG. 1 may be delivered by conveyor (not shown) to the feed hopper 64 and subsequently introduced into the interior of the drum cylinder 10 through the scoops 68 rotating within the box channel 62.

Downstream of the recycle feed assembly 60, the interior surface of the drum cylinder 10 includes staggered rows of sawtooth flighting 72. The sawtooth flighting 72 is fixed upright on the drum cylinder 10 and comprises upright plates having irregular step-type upper surfaces to mix and stir material within the annulus of the cylinder and secondary air tube 42. At the end of the mixing zone is located the discharge housing 34 as previously discussed.

A screw conveyor 74 is mounted beneath the secondary air tube 42 within the drum cylinder 10 and and extends through the discharge housing 34. The screw conveyor 74 is connected to conventional equipment (not shown) for feeding binder material or mineral "fines" to the mixing zone. Positioned alongside the screw conveyor 74, and likewise extended through the discharge housing 34, is an asphalt injection tube 76. The asphalt injection tube 76 is connected to conventional equipment (not shown) for spraying liquid asphalt in the mixing zone of the drum cylinder 10.

In operation, virgin aggregate from stockpile inventories is introduced by the material conveyor 30 to the feed chute 22. The aggregate falls onto the slide plate 24 of the feed chute 22 and is delivered to the drum cylinder 10 as it is rotated by drive rollers 18. The guide paddles 50 direct the aggregate downstream to the bucket flighting 52 with rotation of the drum cylinder 10. In the region of the bucket flighting 52, this flighting lifts and drops the aggregate to create a curtain of falling aggregate across the interior of the drum cylinder 10.

At the combustion assembly 40, primary air and fuel are forced by the blower 48 through the fuel tube 44 to the burner head 46. A radiant flame from the burner head 46 is directed into a combustion zone of the drum cylinder 10. Within the combustion zone, the flighting is of the combustion flighting 56 type to confine the aggregate largely to the interior wall of the drum cylinder 10 to ensure that the flame is not extinguished. Material is thus exposed to the radiant heat flux of the flame, but the flighting design prevents the discharge of material directly through the visible portion of the flame.

The hot gas stream generated by the flame at the burner head 46 flows through the interior of the drum cylinder 10 to the inlet end of the drum cylinder 10 to heat and dry aggregate material. The hot gas stream passes through the curtain of falling aggregate developed by the bucket flighting 52 and into the feed chute 22. The gas stream and any dust particles which may be entrained in the gas pass through the exhaust port 26 of the feed chute 22 to air pollution control equipment, such as a baghouse, where the dust is removed from the process gas by fabric filtration.

The inclined orientation of the drum cylinder 10 causes the aggregate to move downstream through the heating, drying and combustion region. The heated and dried aggregate is delivered to the guide plates 58 which direct the material in contact with recycle asphalt fed from the recycle feed assembly 60. Recycle asphalt is delivered by conveyor through the feed hopper 64 to the box channel 62 around the drum cylinder 10. The recycle material is then picked up by the scoops 68 and delivered through a scoop opening 70 to the interior of the drum cylinder 10. It should be noted that the location of the recycle feed assembly 60, the direction of flow of the combined aggregate and recycle material within the drum cylinder 10, and the secondary air tube 42 shield the recycle material from any contact with the flame from the burner head 46 and the generated hot gas stream.

The aggregate and recycle material are then mixed and stirred by the sawtooth flighting 72 in the annulus formed by the secondary air tube 42 and drum cylinder 10. Dust binder or mineral fines are delivered through the screw conveyor 74 while liquid asphalt is sprayed through the injection tube 76. The aggregate, recycle, binder and liquid asphalt are therefor combined in intimate admixture to form an asphaltic composition directed to the discharge mouth 36 of the discharge housing 34. The final asphaltic product may then be held in temporary storage facilities or delivered to a transport vehicle for use in pavement construction.

As in the case with the recycle material, the liquid asphalt and the mineral fines are effectively isolated from the flowing hot gas stream within the drum cylinder 10. Since the normally troublesome materials of asphalt production, such as the recycle material, liquid asphalt and dust binder, are shielded from contact with the flame of the burner head 46 and with the hot gas stream, degradation of the asphalt is virtually eliminated. Such a highly desirable result is achieved by advantageously locating the recycle feed assembly 60, the dust binder screw conveyor 74, and the liquid asphalt injection tube 76, by countercurrent flow of the hot gas and asphalt production constituents, and by the secondary air tube 42 shield the volatile components.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. A method for continuously producing an asphaltic composition from asphalt and aggregates, the steps of said method comprising:

introducing aggregate material interiorly of a first end of an inclined, horizontal rotating drum to flow generally from said first end to the second end of said drum;

generating a hot gas stream within said drum to flow through said drum to said first end in countercurrent relation to said aggregate material;

isolating a zone of said rotating drum from said hot gas stream;

delivering said heated and dried aggregate material to said zone isolated from said hot gas stream;

mixing said aggregate material with liquid asphalt within said zone isolated from said hot gas stream to produce an asphaltic composition; and discharging said asphaltic composition from said rotating drum.

2. The method as set forth in claim 1, including the step of adding recycle asphalt material directly to said zone isolated from said hot gas stream.

3. The method as set forth in claim 1, including the steps of creating a curtain of falling aggregate material within said rotating drum and flowing said hot gas stream through said curtain of falling aggregate material.

4. The method as set forth in claim 1, including the step of blending a fine binder material with said liquid asphalt and aggregate material within said zone isolated from said hot gas stream.

* * * * *

UNITED STATES PATENT AND TRADEMARK OFFICE
CERTIFICATE OF CORRECTION

PATENT NO. : 4,787,938

DATED : NOVEMBER 29, 1988

INVENTOR(S) : MICHAEL R. HAWKINS

Page 1 of 2

It is certified that error appears in the above-identified patent and that said Letters Patent is hereby corrected as shown below:

ON THE COVER PAGE, COLUMN 2, THE FOLLOWING SHOULD BE INCLUDED BEFORE "PRIMARY EXAMINER".

REFERENCES CITED BY APPLICANT

U.S. PATENT DOCUMENTS

| | | |
|---|---|---|
| 1,774,649 | 9/1930 | Hepburn et al |
| 1,836,754 | 12/1931 | Hepburn |
| 1,960,463 | 5/1934 | Taylor |
| 2,421,345 | 5/1947 | McConnaughay |
| 2,487,887 | 11/1949 | McEachran |
| 3,423,222 | 1/1969 | McConnaughay |
| 3,840,215 | 10/1974 | McConnaughay |
| 3,845,941 | 11/1974 | Mendenhall |
| 3,975,002 | 8/1976 | Mendenhall |
| 4,000,000 | 12/1976 | Mendenhall |
| 4,096,588 | 6/1978 | Mendenhall |
| 4,130,364 | 12/1978 | Brown |

UNITED STATES PATENT AND TRADEMARK OFFICE
CERTIFICATE OF CORRECTION

PATENT NO. : 4,787,938

DATED : NOVEMBER 29, 1988

INVENTOR(S) : MICHAEL R. HAWKINS

Page 2 of 2

It is certified that error appears in the above-identified patent and that said Letters Patent is hereby corrected as shown below:

FOREIGN PATENT DOCUMENTS 35737            2/1926           Denmark (w/translation)

OTHER PUBLICATIONS

"Recycling Asphalt Pavements", Brown, Douglas J. Interim Report on Hot Recycling. Demonstration Project No. 39, U.S. Dept. of Transportation, Arlington, Va., April, 1979 p. 7-17.

"Interstate 80 Recycle", AASHTO QUARTERLY, July, 1978.

Signed and Sealed this

Fourth Day of May, 1993

*Attest:*

MICHAEL K. KIRK

*Attesting Officer*      *Acting Commissioner of Patents and Trademarks*